US010331755B2

(12) United States Patent
Redpath

(10) Patent No.: US 10,331,755 B2
(45) Date of Patent: *Jun. 25, 2019

(54) TRANSPORT AND ADMINISTRATION MODEL FOR OFFLINE BROWSING

(71) Applicant: International Business Machines Corporation, Armonk, NY (US)

(72) Inventor: Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 15/729,981

(22) Filed: Oct. 11, 2017

(65) Prior Publication Data

US 2018/0032629 A1 Feb. 1, 2018

Related U.S. Application Data

(63) Continuation of application No. 10/654,214, filed on Sep. 3, 2003, now Pat. No. 9,811,603.

(51) Int. Cl.
*G06F 16/957* (2019.01)

(52) U.S. Cl.
CPC ................... *G06F 16/957* (2019.01)

(58) Field of Classification Search
None
See application file for complete search history.

(56) References Cited

U.S. PATENT DOCUMENTS

| | | | |
|---|---|---|---|
| 6,260,066 B1 | 7/2001 | Bittinger et al. | |
| 6,327,594 B1 | 12/2001 | Van Huben et al. | |
| 6,341,316 B1 | 1/2002 | Kloba et al. | |
| 6,389,461 B1 | 5/2002 | Shah | |
| 6,633,910 B1 | 10/2003 | Rajan et al. | |
| 6,920,488 B1 | 7/2005 | Le Pennee et al. | |
| 6,931,429 B2 | 8/2005 | Gouge et al. | |
| 7,096,501 B2 | 8/2006 | Kouznetsov et al. | |
| 7,136,846 B2 | 11/2006 | Chang et al. | |

(Continued)

FOREIGN PATENT DOCUMENTS

| | | |
|---|---|---|
| EP | 0868063 A2 | 9/1998 |
| JP | 2002117005 A | 4/2002 |

(Continued)

OTHER PUBLICATIONS

"Teleport Pro 1.59 Portable 1.0 MB" http://memorysoftware.blogspot.com/2009/02/teleport-pro-159-portable-keygen-and.html; last visited on Nov. 24, 2009.

(Continued)

*Primary Examiner* — Jeffrey R Swearingen
(74) *Attorney, Agent, or Firm* — Steven M. Greenberg, Esq.; Shutts & Bowen LLP

(57) ABSTRACT

The present invention provides a mechanism for efficiently displaying a web site and its content on a mobile device independent of whether the mobile device is connected or disconnected from the network. When the mobile device requests a server hosting the web site, the server compresses the page elements which compose the web site content. The server transmits the compressed page elements in response to the mobile device's request. The mobile device decompresses the page elements and locally stores the decompressed page elements. The mobile device displays the web site content which is locally stored when a user of the mobile device so requests.

11 Claims, 7 Drawing Sheets

(56) References Cited

U.S. PATENT DOCUMENTS

| | | |
|---|---|---|
| 7,165,056 B2 | 1/2007 | Bodin et al. |
| 7,222,101 B2 | 5/2007 | Bishop et al. |
| 7,346,649 B1 | 3/2008 | Wong |
| 7,448,082 B2 | 11/2008 | Pasteanu |

FOREIGN PATENT DOCUMENTS

| | | |
|---|---|---|
| JP | 2002251348 A | 9/2002 |
| JP | 2003216430 A | 7/2003 |
| TW | 542965 B | 7/2003 |
| WO | WO 01/050298 A3 | 7/2001 |
| WO | WO 0150298 A2 | 7/2001 |
| WO | WO 02/060154 A1 | 8/2002 |

OTHER PUBLICATIONS

IBM. "An Efficient Data Transfer Method on the Internet Using Data Compression According to Contents Type." Res. Dis. Kenneth Mason Publications. vol. 442, No. 131 Feb. 2001.

HTTP: Delta-Encoding Notes .XP-002157520, Jan. 17, 1997 (Williams).

Sun Microsystems, Jar File Overview, 1999, http://java.sun.com/j2se/1.5.0/docs/guide ar/jarGuide.html.

TRANSPORT AND ADMINISTRATION MODEL FOR OFFLINE BROWSING

CROSS-REFERENCE TO RELATED APPLICATIONS

This application is a Continuation of U.S. patent application Ser. No. 10/654,214, filed Sep. 3, 2003, the entirety of which is incorporated herein by reference.

FIELD OF THE INVENTION

The present invention relates generally to improved systems and methods for providing efficient transport of data in a data processing system through a telecommunications network, and, more particularly, to advantageous techniques for providing a seamless user experience when operating a mobile device largely disconnected from an enterprise server resource web site by efficiently transferring data over the air to the mobile device.

BACKGROUND OF THE INVENTION

Server systems provide data and interaction for mobile employee operations for the business enterprise. Mobile employees through mobile devices such as personal digital assistants (PDA), mobile web phones, pocket PCs and laptops access server resources over the Internet via wired or wireless telecommunication networks. When connected, mobile employees access data such as business forms, company guidelines, customer information, and the like. However, there are many times when a mobile employee does not have access to a wired or wireless connection but has a continuing need to access the enterprise data. Additionally, even when a mobile device has access to server resources, transmission of data needs to be efficient to satisfy the changing needs for information. For instance, the current cost of data bandwidth in some countries exceeds $0.01/kbyte.

Current commercial connection systems typically provide cached web pages in a browser on the mobile device for access to only previously browsed information when disconnected or offline. The web cache page process is static in that the process is limited to caching only the browsing paths executed by the mobile employee. To implement this process, a proxy is a software component executed on the mobile device to communicate with the enterprise server and cache visited pages or uniform resource locators (URLs). The proxy requires each request to display a page or URL made to the enterprise server to be redirected to the proxy in order to allow visited pages to be redisplayed when the user is disconnected. This caching process is data intensive since the proxy must make individual hypertext transfer protocol (HTTP) requests for each page accessed by the mobile device as the user browses the web site.

Moreover, the proxy may record each page retrieved from the enterprise server and translate full path names carried in the HTTP request to a specific address depending on the mobile device's chosen medium. For example, a proxy running in a web phone would have to translate the full path names as stored on a web server to full path names to a memory stick. In support of making individual requests, the design of the proxy may consist of intricate code paths and header files associated with individual requests to process each request and response. Further, the transport layer in the communication protocol for mobile devices contains many bits of overhead when transmitting each request.

Clearly, mobile employees need to access enterprise server resources with greater efficiency and in a transparent manner for both connected and disconnected environments. Considering the cost of bandwidth transmission, latency, and the extensive information stored on corporate web sites, a need exists for methods and systems of providing access to an enterprise server resource through a mobile device in an efficient manner since network costs increase as the size of the data delivery increases.

SUMMARY OF THE INVENTION

Among its several aspects, the present invention provides a mechanism for efficiently displaying a web site and its content on a mobile device independent of whether the mobile device is connected or disconnected from the network. When the mobile device requests a server hosting the web site, the server compresses the page elements which compose the web site content. The server transmits the compressed page elements in response to the mobile device's request. The mobile device decompresses the page elements and locally stores the decompressed page elements. The mobile device displays the web site content which is locally stored when a user of the mobile device so requests.

A more complete understanding of the present invention, as well as further features and advantages of the invention, will be apparent from the following Detailed Description and the accompanying drawings.

DETAILED DESCRIPTION

Figure 1:
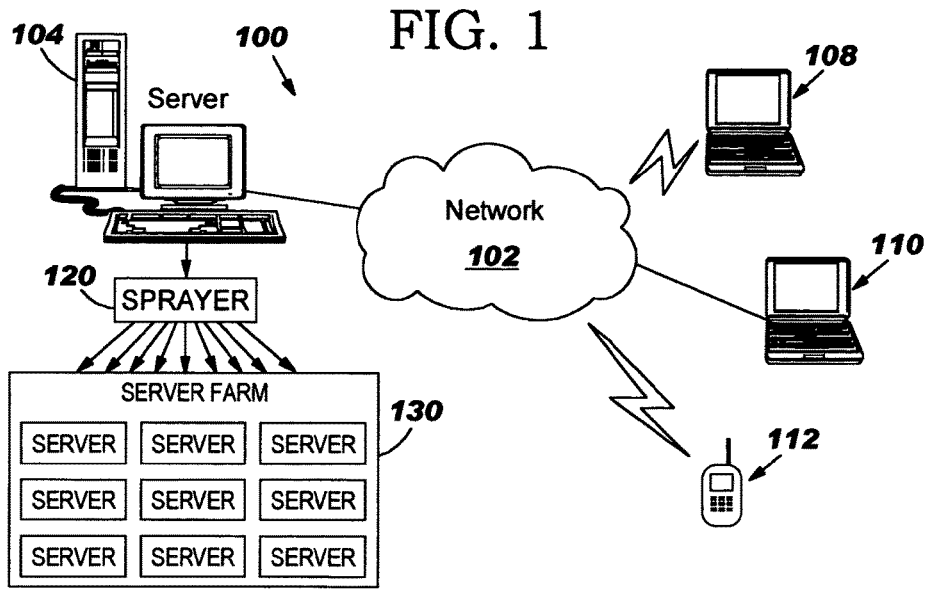
FIG. 1 shows a block diagram of a network of data processing systems in which the present invention may be suitably implemented.

FIG. 1 shows a block diagram representation of a network data processing system in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, fiber optic cables, cable, and wireless communication links. The data link protocols for communicating over these connections may suitably include I.E.E.E 802.11, CDMA, GSM, and the like.

In the depicted example, server 104 is connected to network 102. In addition, mobile devices 108, 110, and 112 also known as mobile clients are connected to network 102. These clients 108, 110, and 112 may be, for example, personal computers such as laptops, personal digital assistants (PDAs), pocket, handheld or palm size personal computers, or mobile phones. In the example shown, mobile client 108 is depicted as a personal computer laptop wirelessly connected to the network 102, mobile client 110 is depicted as a personal computer laptop wired to the network 102, and mobile client 112 is depicted as a mobile phone wirelessly connected to the network 102. Server 104 provides data, such as documents, to clients 108, 110, and 112. While three clients are shown for ease of illustration, it will be recognized that a typical network may include a large number of clients of varying types and such networks are contemplated by the present invention as addressed further below.

Server 104 may suitably include a web server. The term "web server" as used herein includes computer instructions which at least implement the server side responsibilities of a standard communication protocol such as HTTP to deliver virtually all files and other data, collectively called resources, over the network 102, whether the resources are HTML files, image files, video files, audio files, query results, and the like.

Clients 108, 110, and 112 are clients to server 104. Network data processing system 100 may include additional servers, clients, and other devices not shown. In the depicted example, network data processing system 100 including network 102 represents a worldwide collection of networks and gateways that use the TCP/IP suite of protocols to communicate with one another. The heart of the network 102 is a backbone of high-speed data communication lines between major nodes or host computers, consisting of thousands of commercial, government, educational and other computer systems that route data and messages. Of course, network data processing system 100 also may be implemented as a number of different types of networks, such as for example, the Internet, an intranet, a local area network (LAN), or a wide area network (WAN). FIG. 1 is intended as an illustrative example, and not as an architectural limitation for the present invention. Server 104 and clients 108, 110, and 112 are adapted in accordance with the present invention as discussed below.

To provide service on a scalable range, a server farm 130 may be used. Server 104 may direct requests from clients to one of the servers in server farm 130 through sprayer 120. The sprayer distributes requests to one of the servers in the server farm and may perform other functions, such as load balancing. Each server in the server farm may run all the available applications. Server 104 and server farm 130 may share a network file system so that data stored in a hierarchical structure may be accessible by any of the servers using known relative or full path name navigation techniques. For example, each server may have access to an image file stored in tag image file format (TIFF) in a /server/images directory by issuing standard directory commands.

Figure 2:
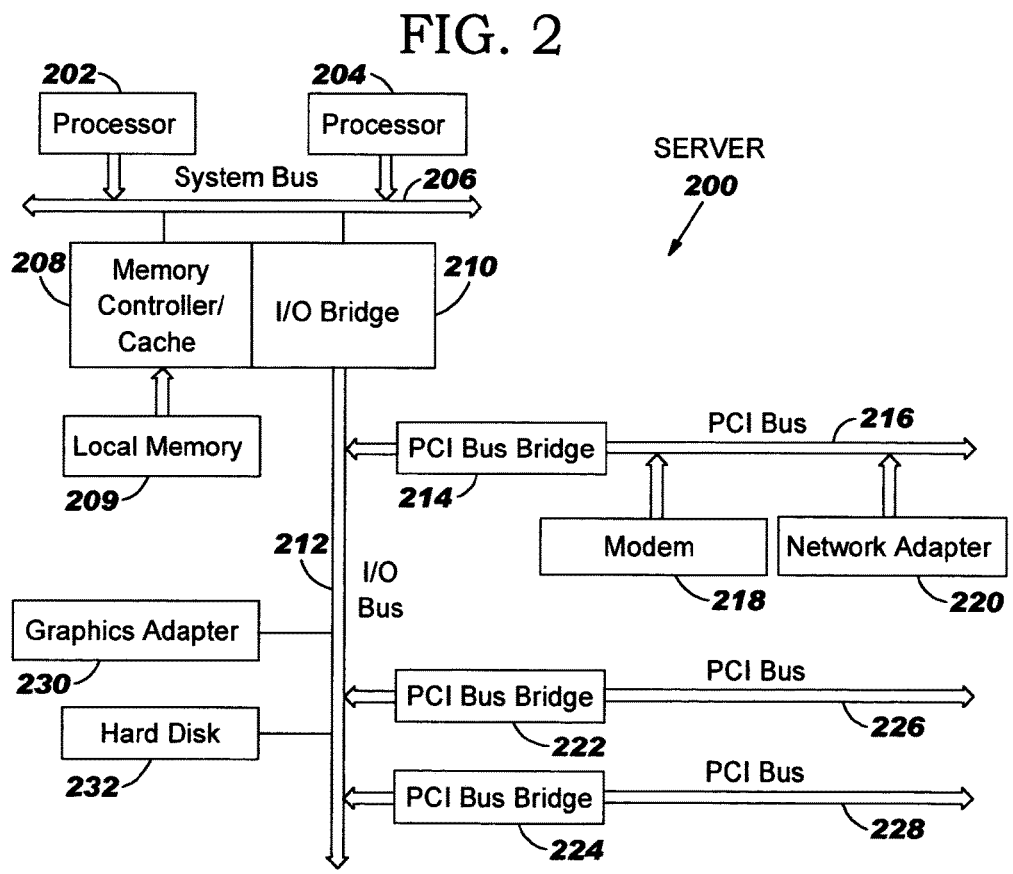
FIG. 2 is a block diagram of a data processing system that may suitably be employed as a server in the network of FIG. 1 in accordance with a presently preferred embodiment of the present invention.

FIG. 2 shows a block diagram of a data processing system that may be suitably employed as a server, such as the server 104 of FIG. 1 in accordance with a presently preferred embodiment of the invention. Data processing system or server 200 may be a symmetric multiprocessor (SMP) system including a plurality of processors 202 and 204 connected to system bus 206. Alternatively, a single processor system may be employed. A memory controller/cache 208 is also connected to system bus 206. The memory controller/cache 208 provides an interface to local memory 209. An input/output (I/O) bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communication links to clients 108, 110, and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation, running the Advanced Interactive Executive (AIX) operating system or LIMA operating system.

Figure 3:
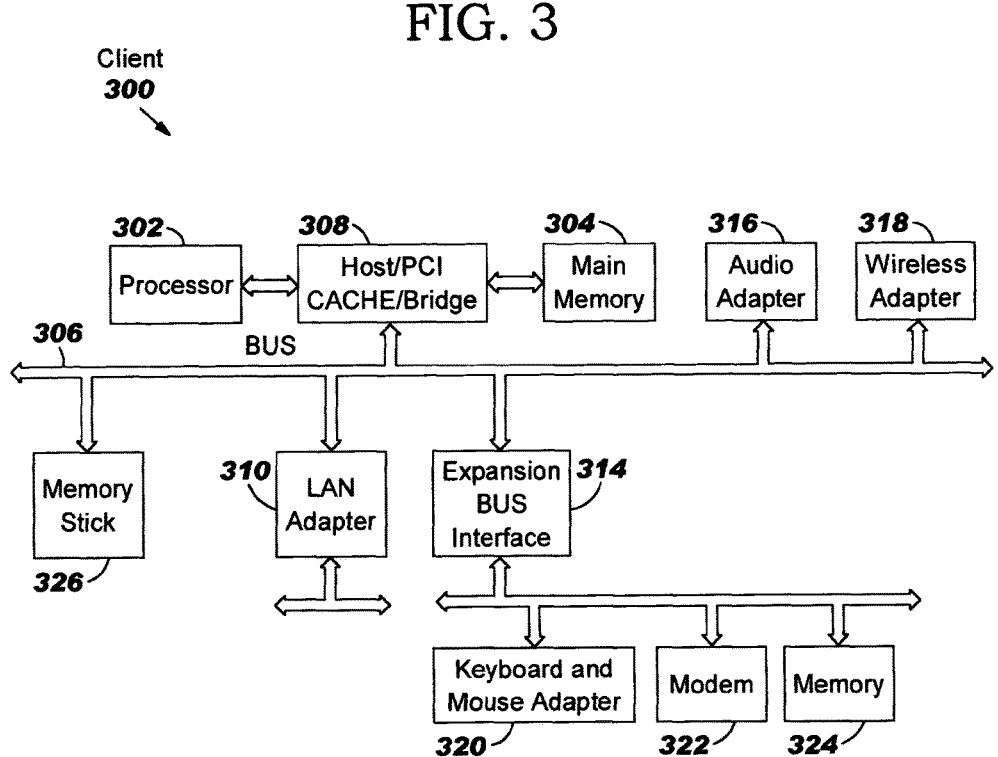
FIG. 3 is a block diagram illustrating a mobile client device in which the present invention may be implemented.

Turning to FIG. 3, this figure shows a block diagram illustrating a mobile client device in which the present invention may be suitably implemented. Mobile client device 300 may suitably be a handheld computer which as illustrated employs a peripheral component interconnect (PCI) local bus architecture. Although a PCI bus is shown, other bus architectures such as Accelerated Graphics Port (AGP) and Industry Standard Architecture (ISA) may be used. A processor 302 and main memory 304 are connected to PCI local bus 306 through PCI bridge 308. PCI bridge 308 also may include an integrated memory controller and cache memory for processor 302. In the depicted example, a local area network (LAN) adapter 310, an expansion bus interface 314, an audio adapter 316, a wireless adapter 318, and a memory stick 326 are connected to the PCI local bus 306 by direct component connection. Expansion bus interface 314 provides a connection for a keyboard and mouse adapter 320, a modem 322, and additional memory 324.

An operating system runs on processor 302 and is used to coordinate and provide control of various components within the data processing system 300 of FIG. 3. The operating system may be a commercially available operating system, such as Symbian OS 6, Symbian OS 7.0, Palm OS 5.21, Palm OS 6.0, Windows CE 3.0, or the like. An object oriented programming system such as Java may run in conjunction with the operating system and provide calls to the operating system from Java programs or applications executed by the processor 302 in the data processing system 300. "Java" is a trademark of Sun Microsystems, Inc. Instructions for the operating system, the object-oriented operating system, and applications or programs such as a web browser or web server are located on storage devices, such as memory stick 326, and may be loaded into main memory 304 for execution by processor 302. The processor 302 may typically run at 204 Mhz or greater.

Those of ordinary skill in the art will appreciate that the hardware in FIG. 3 may vary depending on the implementation. Other internal hardware or peripheral devices, such as flash ROM or equivalent nonvolatile memory, and the like, may be used in addition to or in place of the hardware depicted in FIG. 3. Also, the processes of the present invention may be applied to a multiprocessor data processing system.

As another example, mobile device 300 may be a PDA device, which is configured with ROM and/or flash ROM in order to provide non-volatile memory for storing operating system files and/or user-generated data.

The depicted example in FIG. 3 and above-described examples are not meant to imply architectural limitations. For example, mobile device 300 also may be a notebook computer or a cellular phone having personal digital assistant functionality in addition to taking the form of a hand-held computer.

Figure 4:
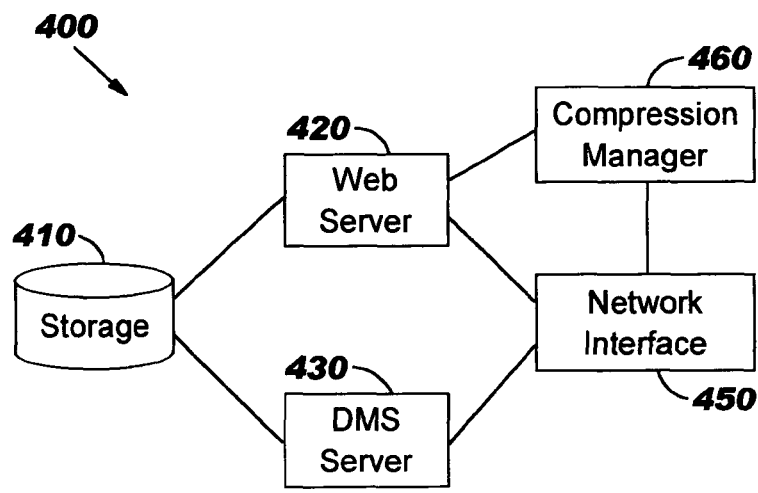
FIG. 4 is a block diagram illustrating the functional software components of a server in accordance with a preferred embodiment of the present invention.

With reference now to FIG. 4, a software functional block diagram is shown of an exemplary server 400 which may be suitably employed as server 104 of FIG. 1 in accordance with the present invention. Server 400 includes a web server 420, an optional device management system (DMS) server 430, storage 410, a compression manager 460, and a network interface 450. Web server 420 may be a known commercially available web server such as IBM's Webshpere® or the like. Web server 420 and DMS server 430 access storage 410 by issuing storage application programming calls on processor 202. Web server 420 and DMS server 430 deliver web site content to users by issuing network interface application programming calls on processor 202. The network interface 450 in turn transmits the web site content through network 102. Storage 410 may include a hard disk 232, local memory 209, or a network file system shared between server 400 and server farm 130. An exemplary network interface 450 is a TCP/IP protocol stack. Compression manager 460 provides a means for compressing page elements which represent the information content on a hosted web site. Compression manager 460 may be developed using various known web development environment and implemented in the form of a servlet, enterprise javabean, or the like. Compression manager 460 shall invoke known compression functions provided in standard libraries such as those provided in the J2ME Java environment or the like in order to compress the page elements organized in a hierarchical directory structure as further described below in connection with the discussion of FIG. 6. DMS components, including a DMS client, as further described below in connection with the discussion of FIG. 5, and a DMS server 430, provide an optional means to install files on a mobile device and manifest their contents for efficient update from an external device.

The storage 410 stores the web site content as page elements organized in a hierarchical directory structure as further described below in connection with the discussion of FIG. 6. The term "page element" as used herein includes computer files containing text, graphic, video, audio data, or any combination thereto. A user navigates through the hierarchical directory through the web server 420 as the user follows hot links within the web site.

In typical web server implementations, communication between a web client and a web server require many HTTP requests to deliver the web site content stored in the web server. Typical HTTP transactions follow the same general format. Each client request and server response has three parts: the request or response line, a header section, and the entity body. A client initiates a transaction by generating a request destined to a server. In reply to a request, the server produces a header section and an entity body. In typical HTTP transactions a single request is necessary for each page element supplied by the web server. For example, a web site's front page may have a hypertext markup language (HTML) file indexing many page elements such as images, video clips, and audio clips. To retrieve each indexed element, a separate HTTP requests and a corresponding HTTP reply is necessary for each indexed element. Each HTTP reply contains an uncompressed page element and a header. This header is redundant with the other replies' headers resulting in large quantities of overhead data being transmitted when a user peruses a web site.

To advantageously preserve data bandwidth carried through the network and to the mobile device, the web server 420 in conjunction with the compression manager 460 compresses all the files organized in the directory structure using relative path name addressing and delivers the compressed file through the network to the mobile device. A unique GET request is defined to retrieve all of the content of page and page elements to be delivered as one entity body. The compression manager 460 interprets the GET request sent from a mobile device to compress all the files associated with the web site.

Interactions between a web server and a compression manager implemented as an enterprise java bean, servlet, or the like, are well known to one of ordinary skill. An exemplary compressed file format is a Java Archive entity (JAR) file that is created using a java utility provided by Sun Microsystems®. Transmitting the compressed file through the network in a reply to one request by the web client reduces the overhead caused by multiple requests. The interaction between the web server and mobile client will be described further below.

The optional DMS server 430 provides an inventory management mechanism to track the last compressed file sent to individual mobile devices. The DMS server 430 allows server 400 to transmit compressed files that contain only the files that have changed since the last download to the web device.

Figure 5:
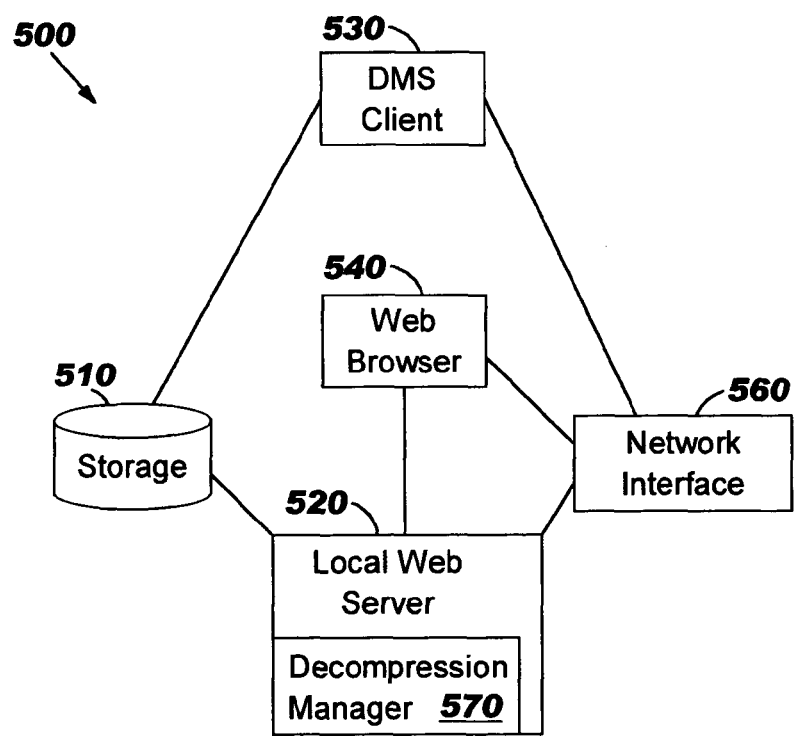
FIG. 5 is a block diagram illustrating the functional software components of a specific example of a mobile device in accordance with a preferred embodiment of the present invention.

With reference now to FIG. 5, a block diagram illustrating the software functional components is shown of a mobile device 500 which may suitably be employed as mobile device 300 in accordance with the present invention. The mobile device 500 includes a local web server 520, a web browser 540, an optional device management system (DMS) client 530, storage 510, and a network interface 560. The web server 520 and DMS client 530 access storage 510 by issuing storage application programming calls on processor 202. The local web server 520 and DMS client 530 connect to the web server 420 and DMS server 430, respectively, by issuing network interface application programming calls on processor 302. The network interface 560 in turn transmits a request through network 102.

Local web server 520 performs the server responsibilities defined in HTTP or similar protocol. Local web server 520 includes a decompression manager 570. Decompression manager 570 receives a compressed file composed of compressed page elements, decompresses the file by invoking known decompression functions provided in standard libraries such as those provided in the J2ME Java environment to decompress the page elements organized in a hierarchical directory structure as further described in FIG. 6 and stores the decompressed page elements to storage 510. Local web server 520 delivers web content to the user of the mobile device 500 through a loopback connection between local web browser 540 and local web server 520. The term "web browser" as defined herein refers to a software application at least implementing the client responsibilities defined by HTTP or similar protocols. Examples of suitable web browsers include ThunderHawk from BitStream®, Opera, NetFront®, Netscape Navigator® from AOL®, and Internet Explorer® from Microsoft®.

In operation, decompression manager 570 requests the compressed file from server 400. The compressed file is received by decompression manager 570 where decompression manager 570 decompresses the file and stores the decompressed page elements using their relative path names mounted on a mount point within storage 510 specific to the mobile device 500. The stored files on the mobile device are a mirror copy of page elements representing the web site on server 400. After decompressing page elements, a user of the mobile device 500 may browse any of the locations within the mirrored files that were downloaded in compressed form.

The optional DMS client 530 further issues an HTTP or like request periodically when the mobile device is connected to network 102 requesting that either the entire compressed file containing all page elements be sent from server 400 or page elements which have changed since the last time the DMS client 530 received the compressed file. The DMS server 430 determines whether a page element stored at server 400 has changed since the last download of the compressed file to the mobile device. When updating the locally stored web content, DMS client 530 sends a request including a listing of all the page elements and their respective last modified date. The DMS server compares the last modified date for each page element in the listing received with a corresponding page element stored at storage 410. Any files found at storage 410 that are newer including files not found in the listing but within the directory structure than those listed are compressed and sent to the mobile device 500. The DMS client 530 receives this compressed file, decompresses these files, and updates the files on its storage 510. The DMS client 530 may be configured to request updates at various periodic intervals.

Figure 6:
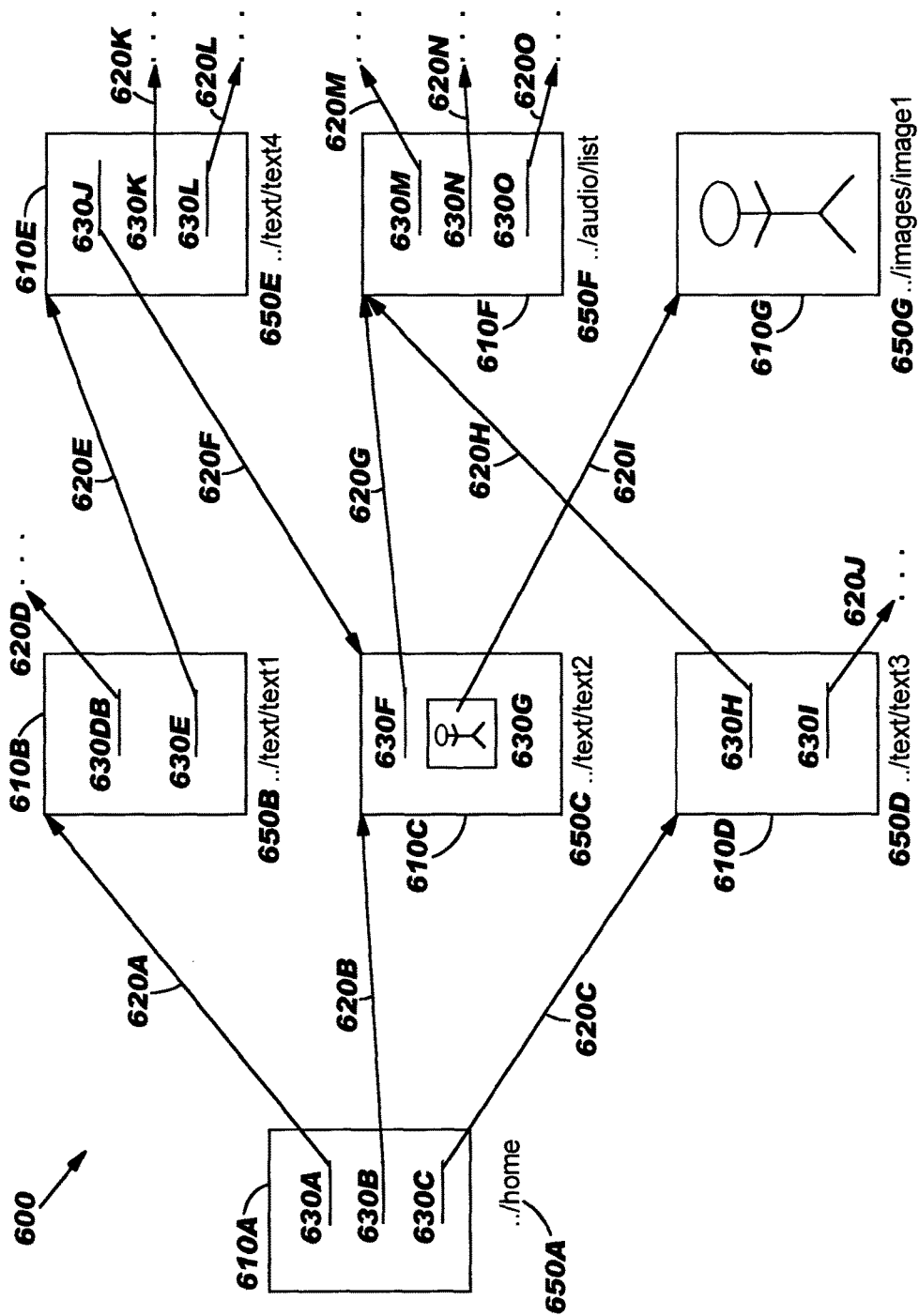
FIG. 6 is an exemplary organization of page elements as stored for composing a web site.

FIG. 6 illustrates an exemplary organization 600 of stored page elements 610A-610G for composing a web site's content. Representative page element 610A includes hot links 630A-C which address page elements 610B-D. Addresses 620A-C connect page element 610A to page elements 610B-610D. Page element 610B connects to page elements including 610E through addresses 620D and 620E using hot links 630D and 630E. Page element 610C connects to page elements 610F and 610G, an image only page element, through addresses 620G and 620I using hot links 630F and 630G. Page element 610D connects to page elements including 610F through addresses 620H and 620E using hot links 630D and 630E. Page element 610E connects to page element 610C and other page elements not shown through addresses 620F, 620K, and 620L using hot links 630J-L. Page element 610F connects to audio page elements not shown through addresses 620M-O using hot links 630M-O.

Description 650A, ../home, shown below page element 610A represents the relative path name of the location in storage of page element 610A. The '..' represents a fixed location on a storage element. For example, when this organization is stored on server 400 the '..' may represent a directory in the server's file system such as /server/usr and when this organization is stored on a mobile device in memory the '..' may represent a directory, such as /my_mobile.

Figure 7:
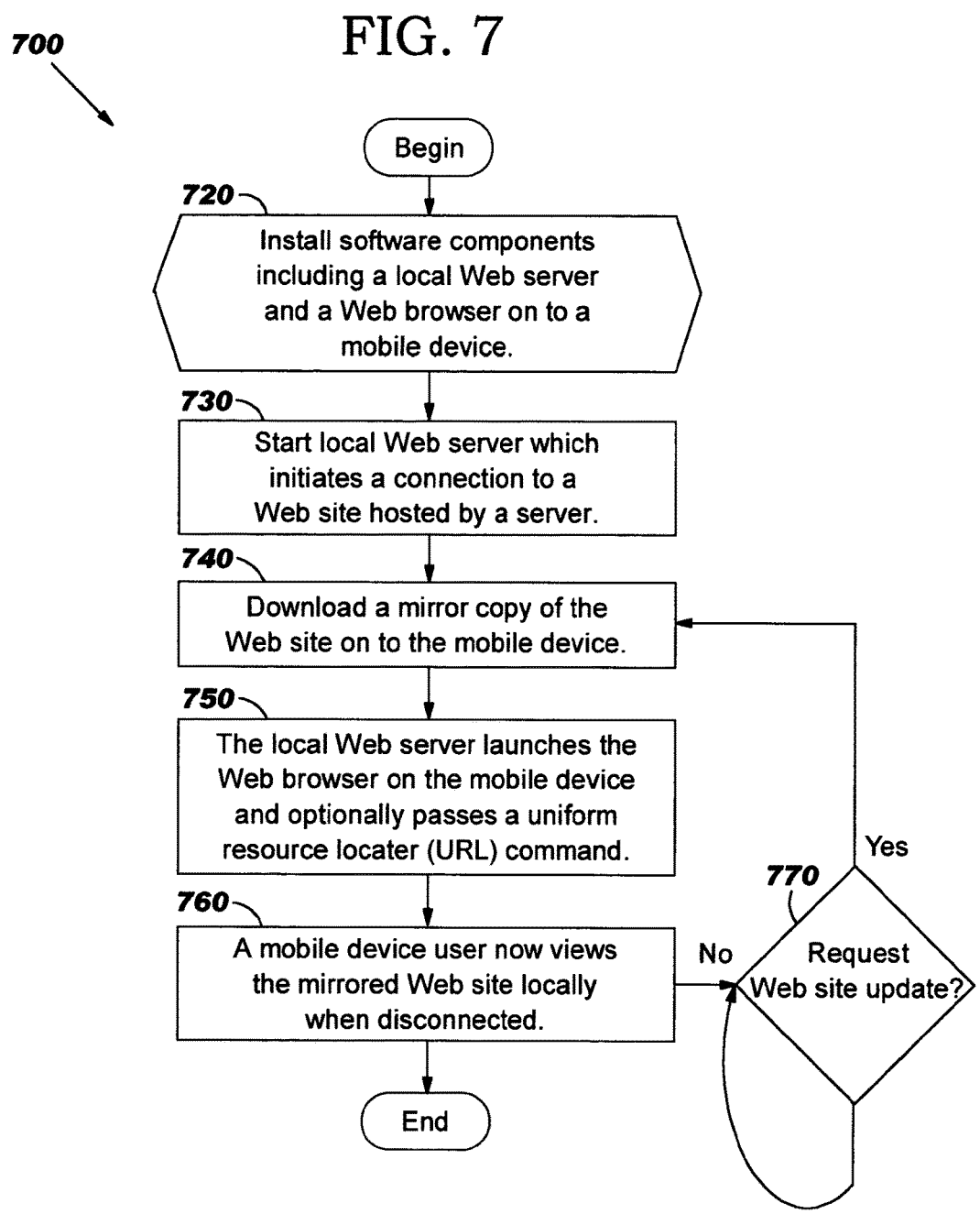
FIG. 7 is a flowchart illustrating a method of mirroring web site content on a mobile device in accordance with the present invention.

FIG. 7 shows a flowchart illustrating a method 700 of mirroring web site content on a mobile device in accordance with the present invention. At step 720, software components including local web server 520 and web browser 540 are installed onto a mobile device. At step 730, the local web server 520 is started. Once started, the local web server 520 initiates a connection to a web site hosted by a server 400. Although any web site would be applicable to the environment of the present invention, a corporate web site servicing their employees may advantageously employ of the present invention. At step 740, server 400 downloads a compressed file containing a mirror copy of the directory structure containing the organized page elements, the page elements define the content of the web site which is hosted by server 400. Server 400 may have a copy of the compressed file to readily download to new mobile device. Server 400 may also create the compressed file upon connection to the mobile device. If the compressed file is created upon connection, the server 400 may create a compressed file either containing all the page elements, which compose the web site, or the page elements that have changed since the last time a compressed file was downloaded to the mobile device. The downloaded compressed file is decompressed and stored on the mobile device. By advantageously downloading a compressed file and reducing the amount of data necessary to download, latency, the amount of time required to retrieve information over the network, is reduced. More detail of step 740 is provided in the discussion of FIG. 8 below.

At step 750, the local web server 520 launches the web browser on the mobile device 500. The local web server 520 optionally passes to web browser 540 the uniform resource locator (URL) of the web site hosted on server 400 causing local web server 520 to provide the content of the decompressed stored files to the user. Without passing the URL, the user, utilizing known means, would specify the URL associated with the web site hosted on server 400. In either case, at step 760, the local web server 520 through a loop back connection recognizes the URL to display web site content locally stored on the mobile device 500 allowing the mobile device user to peruse the information content of the web site locally stored independent of whether the mobile device has an established connection to the network 102.

Various techniques may be implemented in the local web server 520 to determine whether to serve the local content or request updated content. Steps 770 and 780 provide one technique for updating the locally stored Web content assuming the mobile device has an established connection to the network. At step 770, the local web server determines whether to request an update from the server 400. This determination can be driven by a user request or under control of a configurable interval timer.

Figure 8:
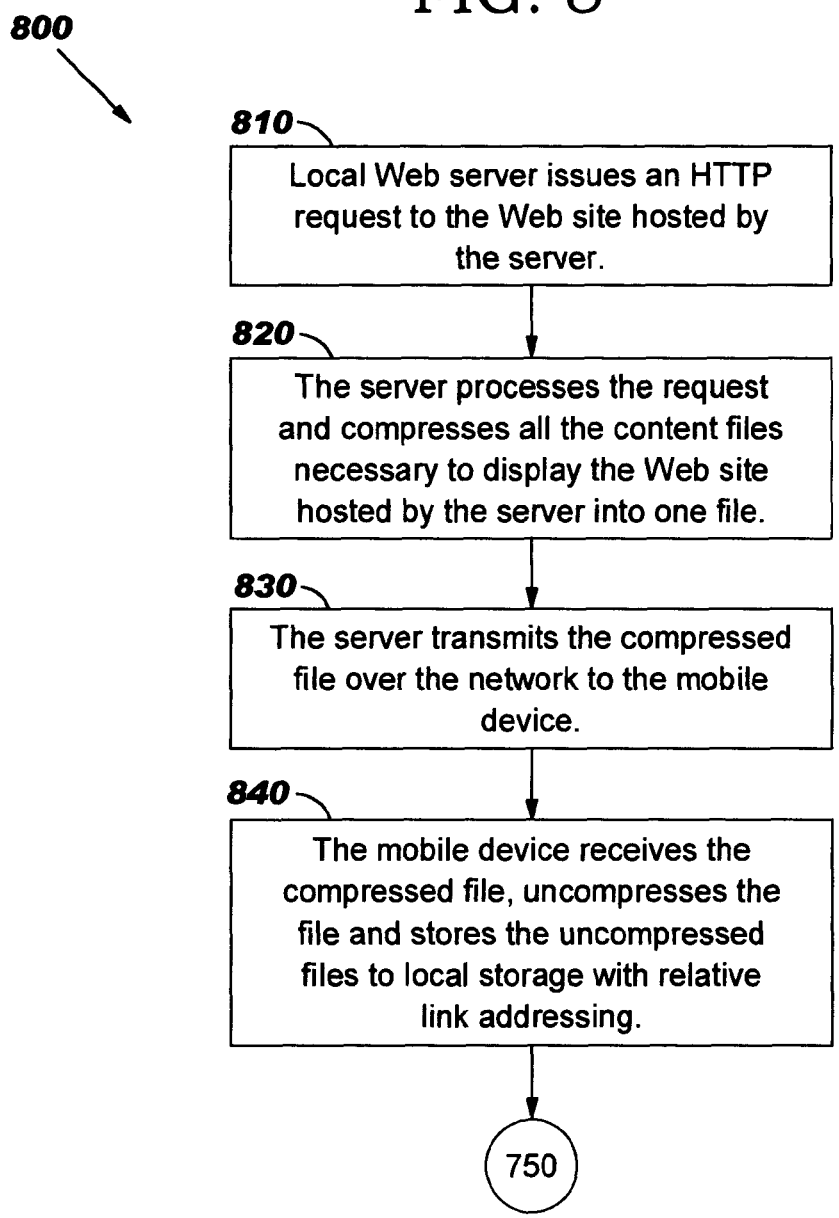
FIG. 8 is a flowchart illustrating further details of the step of downloading a mirror copy of the web site to a mobile device as described in FIG. 7.

With reference now to FIG. 8, flowchart 800 illustrates further details of step 740 described in FIG. 7. At step 810, the local web server 520 issues a single HTTP request, such as a known GET request having unique contents, to the server 400. A listing of files with their associated last modified date may optionally be encoded in the HTTP request body. For example, if a JAR file is utilized in an embodiment, the JAR's manifest file would provide such a listing.

At step 820, the web server 420 on server 400 receives the HTTP request. GET requests are recognized by web servers. Web servers operate in a known manner to recognize a GET request and trigger the execution of a servlet, javabean, and the like, such as compression manager 460. Compression manager 460 compresses all the page elements necessary to display the web site content hosted by server 400. Optionally, the server 400 may contain a preexisting compressed file to be readily retrieved by any connecting mobile device. If, however, the HTTP request contains the listing of files with their associated last modified date, the compression manager 460 may compare the file dates with those currently stored on server 400 and create a tailored compressed file containing only the changed files.

At step 830, the server 400 transmits the compressed file to the mobile device 500. The compressed file would be carried in the body of the HTTP reply message. At step 840, upon receipt of the compressed file, local web server 520 decompresses the compressed file and stores the decompressed files locally using relative path names, replacing any existing files. The relative path names allow the local web server 520 to navigate through the locally stored web site on the web device file system.

Figure 9:
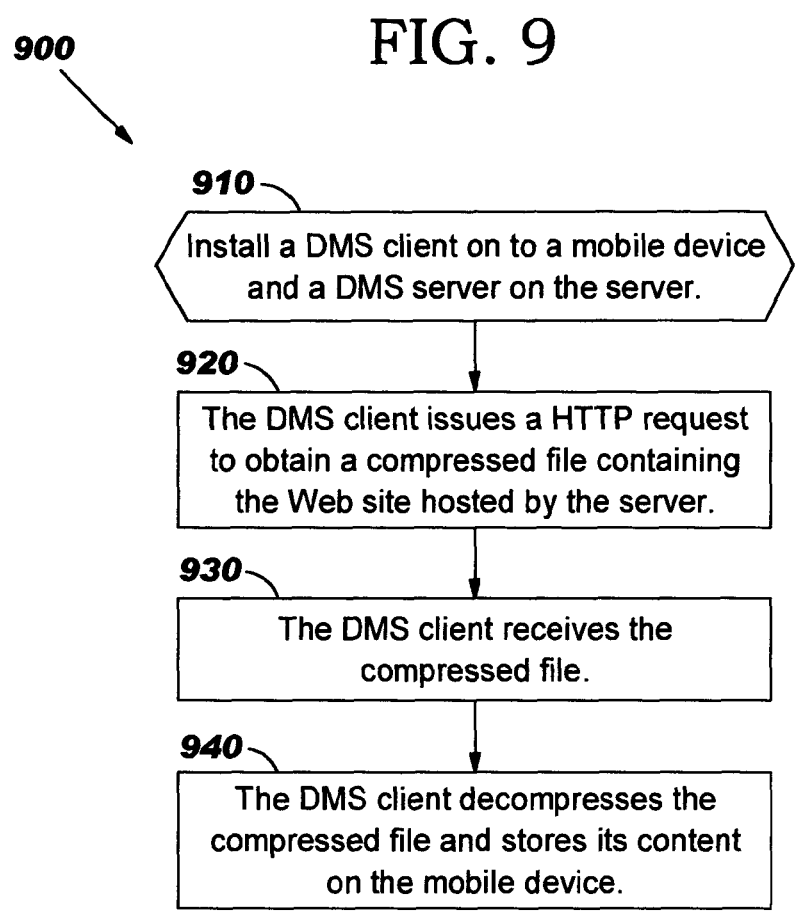
FIG. 9 is a flowchart illustrating an alternate embodiment of a process for requesting an update of the web site content and down loading the updated compression file as described in FIG. 7.

With reference now to FIG. 9, flowchart 900 illustrates an alternate embodiment of steps requesting an update of the web site content and down loading the updated compression file as described in FIG. 7. At step 910, a DMS client is installed on the mobile device 500 and a DMS server is installed on the server 400. Rather than the local web server 520 issuing the HTTP request to server 400, the DMS client performs file management functions including requesting and updating the local web content, all without burdening the local web server 520. In this embodiment, the local web server does not contain any file management function. At step 920, the DMS client issues a HTTP request to obtain a compressed file containing the web site hosted by the server. It is noted that the DMS server 430 on server 400 alternatively performs the functions of the compression manager described above.

At step 930, the DMS client receives the compressed file from server 400. The DMS server performs the file management functions including compressing the page elements on the server 400 in lieu of compression manager 460. At step 940, the DMS client decompresses the compressed file and stores the decompressed files in the mobile device for subsequent retrieval by a local web browser.

Additionally, the DMS client may query the DMS server to determine if there are any jobs awaiting action by the DMS client. If there are, the DMS client may act on the next awaiting job. When the awaiting job indicates a compressed file to be downloaded to the DMS client, this query mechanism allows the DMS server to manage the version of web site content downloaded to the mobile device.

It should be understood that although in the preferred embodiment of the invention the compression manager, decompression manager, web servers, web browsers, DMS servers, DMS clients, and Network interfaces are implemented in software, in other embodiments of the invention all or portions of the instruction steps executed by these software portions may be resident in any of these components in firmware or in other program media in connection with one or more computers, which are operative to communicate with server 400 and mobile client 500.

The description of the present invention has been presented for purposes of illustration and description, and is not intended to be exhaustive or as limiting the invention in the form disclosed. Many modifications and variations will be apparent to those of ordinary skill in the art. The embodiment was chosen and described in order to best explain the principles of the invention, their practical application, and to enable others of ordinary skill in the art to understand the invention. Subject to the limitations of the claims, various embodiments with various modifications as necessary to adapt the present invention to a particular environment or use are hereby contemplated, including without limitation the adaptation of various teachings herein in light of rapidly evolving hardware and software components and techniques.

I claim:

1. A server for delivering a web site over a network in response to one request, the server comprising:
   a memory containing:
   a web server for hosting a web site composed of page elements connected to a web browser through a loop-back connection, the web server including a decompression manager for receiving a compressed file containing compressed page elements, for decompressing the compressed file into page elements, and storing the page elements to the memory, the web server reading the stored page elements and serving the page elements to the web browser;
   a compression manager for receiving a request for a compressed file and for transmitting the compressed file composed of page elements to a mobile device comprising a device management system client for updating the locally stored page elements, the device management system client periodically issuing to the server, when the mobile device is connected to the network, a request for an update to the compressed file, wherein the request contains a listing of stored page element names and their associated last modified date locally stored; and
   a processor for running the web server and the compression manager.

2. The server of claim 1 wherein the compression manager stores the page elements according to their relative path names.

3. The server of claim 1 wherein the compression manager transmits a compressed file previously stored in memory.

4. The server of claim 3 wherein the compressed file transmitted includes all the page elements which compose the web site.

5. The server of claim 3 wherein the compressed file transmitted includes page elements having an associated last modified date which is later than corresponding page elements stored on the web device and page elements having no corresponding page element on the web device.

6. A method for browsing web content on a mobile device comprising:
   providing a web server on a mobile device;
   transmitting a request to a server for a mirror copy of a web site being hosted by the server;
   compressing page elements composing the web site to define a compressed file;
   receiving the compressed file at the mobile device;
   decompressing the compressed file into local page elements;

storing the local page elements onto the mobile device;
displaying the local page elements to a user of the mobile device;
updating the locally stored page elements by periodically issuing to the server, when the mobile device is connected to the network, a request for an update to the compressed file, wherein the request contains a listing of stored page element names and their associated last modified date locally stored.

7. The method of claim 6 where in the compressing step compresses the page elements according to their relative path names.

8. The method of claim 6 wherein the updated compressed file comprises a set of all the page elements which compose the web site.

9. The method of claim 6 wherein the updated compressed file retrieved contains new page elements and page elements that have a last modified date which is more recent than those page elements stored on the mobile device.

10. The method of claim 6 wherein the displaying step is performed while the mobile device is disconnected from the network.

11. A non-transitory computer-readable medium whose contents cause a network processing system having a mobile device, a server, and a network to perform a download of a compressed file containing page elements representing web site content, the mobile device displaying web site content independent of the mobile devices connectivity to the network, the network processing system having a client program and a server program with functions for invocation, by performing the steps of:
  sending a request to the server program by the client program for a mirror copy of a web site being hosted by the server;
  receiving the request by the server program;
  invoking the function by the server program in response to receiving the request such that the web site having page elements are compressed;
  returning the compressed file to the client program by the server program;
  decompressing the compressed file by the client program into local page elements;
  storing the local page elements by the client program onto the mobile device;
  displaying the local page elements by the client program to a user of the mobile device; and,
  updating the locally stored page elements by periodically issuing to the server, when the mobile device is connected to the network, a request for an update to the compressed file, wherein the request contains a listing of stored page element names and their associated last modified date locally stored.

* * * * *